J. B. Laville,
Felting Machine.
No. 11,731. Patented Sep. 26, 1854.
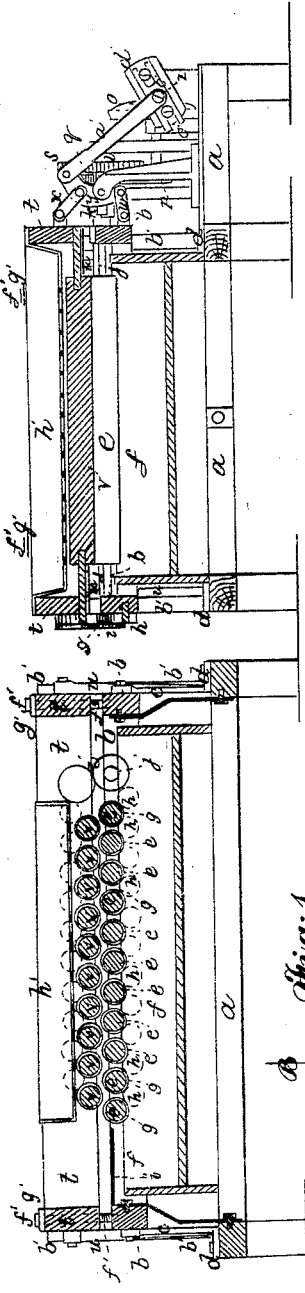

UNITED STATES PATENT OFFICE.

JOHN BAPTISTE LAVILLE, OF PARIS, FRANCE.

MACHINERY FOR FELTING HATS AND HAT-BODIES.

Specification of Letters Patent No. 11,731, dated September 26, 1854.

*To all whom it may concern:*

Be it known that I, JOHN BAPTISTE LAVILLE, of Paris, France, have invented certain new and useful Improvements in the Method of Felting Hat-Bodies, of which the following is a full, clear, and exact description, reference being had to the accompanying drawings, making part of this specification, in which—

Figure 1, is a plan; Fig. 2, a longitudinal section taken at the line A, $a$, of Fig. 1; and Fig. 3, a cross section taken at the line B, $b$, of Fig. 1.

The same letters indicate like parts in all the figures.

Hat bodies, particularly when made of fur, are formed in a conical shape with the tip rounding and very thin at the tip and gradually thicker toward the rim to give strength and stiffness to the rim, which requires it, without too much weight. It is this variation in the thickness which has heretofore defeated all attempts to felt hat bodies by machinery. The felting of cloth has long since been effected successfully by machinery because the bat is formed of uniform thickness, and the object in felting is to maintain this uniform thickness, but the same mode of procedure will not answer the purpose for the felting of hat bodies, on account of the varying thickness from the tip to the rim.

In view of the nature of the article to be operated upon and the result to be produced my invention consists in felting hat bodies by causing them to pass between two series of rollers, when the two series of rollers are mounted in two separate frames, and operated by a continuous (but slow) rotary motion to carry the hat bodies through between them, and a longitudinal reciprocating motion in the direction of the axes of the rollers, the two series moving in opposite directions for the purpose of felting, the lower rollers being combined with a trough or vessel containing hot water, so that, as they rotate, the lower part of their peripheries shall rotate in hot water, which is thus carried up in a sufficient quantity to keep the under surface of the hat bodies moistened, whilst the upper rollers and the upper surface of the hats, are moistened and heated by hot water which drips through small apertures in the bottom of another vessel.

In the accompanying drawings $a$ represents the frame which may be varied at pleasure, and $b$ a square frame sustained on four rockers $c$, $c$, $c$, $c$, jointed at their upper ends to the ends of the frame, one near each corner, and their lower ends resting in sockets in metal plates $d$, $d$, $d$, $d$, secured to the main frame. The series of bed or bottom rollers $e$, $e$, $e$, made of wood or other suitable material with long journals at each end, are mounted in this frame $b$, so as to be all in the same horizontal frame $b$. The rollers are shorter than the width of the frame in which they are mounted, so that the lower part of their peripheries shall dip in hot water contained in a vat $f$, below, the edges of which extend up to the journals and between the frame $b$, and the ends of the rollers, leaving sufficient room or play for the vibration of the frame $b$, with its series of rollers which will be presently described.

The axle of each roller, outside the frame carries a toothed wheel $g$, and these wheels are connected by intermediate toothed wheels $h$, so that rotary motion being communicated to one, the whole series of rollers will rotate in the same direction. And this rotary motion is communicated to the series of wheels by a toothed wheel $i$ on one end of a shaft $j$ mounted in the frame $b$ and the other end is connected by a sliding clutch $k$ with a short shaft $l$ mounted in the main frame and deriving motion from the driving shaft $m$, by a train of wheels and pinions $n$, $o$, $p$, $q$, $r$, $s$, the object of the sliding clutch being for the purpose of admitting of the vibratory motion of the frame $b$ with its series of rollers. Immediately above the frame $b$ there is a similar frame $t$ and, (just like it) mounted on rockers $u, u$, $u$, $u$, and carrying a similar series of rollers $v$, mounted and connected in a similar manner and deriving motion from the same source, but turning in the opposite direction. The rollers of the upper series are placed with their axes perpendicularly over the spaces between the rollers of the lower series.

The two frames $b$ and $t$ are connected by two connecting rods $w$ and $x$, with the opposite ends of a vibrating lever $y$ which receives motion from a crank $z$ on the driving shaft $m$ by a connecting rod $a'$, so that as the crank rotates, the two frames vibrate in opposite directions, giving to the two series of rollers a longitudinal reciprocating motion in opposite directions. The two frames are maintained laterally during their vibrations by means of end standards $b'\ b'\ b'\ b'$.

The range of vibratory motion of the two rollers can be readily increased or decreased by sliding the crank pin of the crank $z$, further from or nearer to the axis of the driving shaft. For this purpose the crank pin is attached to a plate $c'$ fitted to slide in a suitable groove or recess made in the face of a wheel $d'$ on the end of the driving shaft, and there secured by screws $e'\ e'$.

The upper frame $t$, with its series of rollers is held down to the lower frame $b$ to make pressure on the hat bodies passing between the two series of rollers, by screw bolts $f'\ f'\ f'\ f'$ passing through elongated slots in the upper frame, and topped in the lower frame, india ruber, or other springs $g'\ g'\ g'\ g'$ being interposed between the upper frame and the heads of the screw bolts. The vat $f$, below the lower series of rollers must contain sufficient water for the lower part of the periphery of the rollers to pass in it and carry it up to the hat bodies being felted. And the water is to be kept in a heated state by any known and suitable means, such as a steam pipe from a boiler. And above the upper set of rollers there is another vat $h'$ supplied with hot water in any suitable and well known means, and the bottom of this vat is pierced with rows of small holes in the lines of the rollers, through which the hot water will percolate to keep the upper surface of the hot bodies in a heated and moist state which is necessary to the felting process.

At one end of the lower series of rollers, and on the same plane, there is a table $i'$ on which the hats, properly folded, are placed by the attendant as they are presented to the bight of the two first of the two series of rollers by which it is taken and carried through between the two series by reason of their continuous rotary motion, and as the hat bodies are one by one passed through, they are compressed between the two series of rollers and the required rubbing and felting motion given by the oppositely reciprocating motions of the two series of rollers. When the hats are delivered at the opposite end, they are taken by an operative, unfolded, and the folds reversed, and again passed through the same machine, or another like it placed by the side of it for convenience.

I claim—

1. Arranging the two series of rollers mounted in separate frames held or pressed together substantially as herein described, but this I only claim when the two series of rollers have a continuous rotary motion, and a longitudinal reciprocating motion, the two series moving in opposite directions, substantially as specified.

2. And I also claim in combination with the two series of rollers for felting hats, the mode of supplying hot water to the two surfaces of the hats as they are passed through the machine, as described.

JN. BTE. LAVILLE. [L. S.]

In presence of—
CHARLES LONTHNER,
LOUIS WALTER.